(12) United States Patent
Furlough et al.

(10) Patent No.: US 7,097,773 B1
(45) Date of Patent: Aug. 29, 2006

(54) PROCESS FOR TREATING WATER

(75) Inventors: Tiffani Furlough, Balch Springs, TX (US); Kevin A. Senkevech, Terrell, TX (US)

(73) Assignee: Fritz Industries, Inc., Mesquite, TX (US)

( * ) Notice: Subject to any disclaimer, the term of this patent is extended or adjusted under 35 U.S.C. 154(b) by 126 days.

(21) Appl. No.: 10/854,613

(22) Filed: May 26, 2004

(51) Int. Cl.
    *C02F 1/70* (2006.01)
(52) U.S. Cl. ...................................... 210/757
(58) Field of Classification Search ................ 210/749, 210/757
    See application file for complete search history.

(56) References Cited

U.S. PATENT DOCUMENTS

| 2,013,125 A | 9/1935 | Binns ......................... 260/141 |
| 4,666,610 A | 5/1987 | Kuhns ......................... 210/749 |
| 4,786,434 A * | 11/1988 | Gunter ......................... 252/181 |

OTHER PUBLICATIONS

BRUGGOLITE®, Bruggerman Chemical, Sep. 18, 2001, pp. 1-3.
AMQUEL®, How It Works, Novalek, Inc., 1998, pp. 1-2.

* cited by examiner

*Primary Examiner*—Robert A. Hopkins
(74) *Attorney, Agent, or Firm*—Thomas R. Weaver

(57) ABSTRACT

This invention provides a process for reducing the concentration of chloramines, chlorine, ammonia, nitrates and nitrites in saline and fresh waters by adding to the water a treating material selected from alkali metal and alkaline earth metal formaldehydesulfoxylates in a dry or solution form.

28 Claims, No Drawings

PROCESS FOR TREATING WATER

BACKGROUND OF THE INVENTION

1. Technical Field of the Invention

This invention relates to water treatment. The invention further relates to a method of treating water to decrease the concentration of pollutants dissolved in the water. The invention still further relates to a method of treating water to decrease the concentration of ammonia, chlorine, chloramines, nitrites and nitrates dissolved in the water. The invention particularly relates to a method of treating water with a water soluble, reducing agent comprised of a sulfur-containing organic compound to decrease the concentration of ammonia, chlorine, chloramines, nitrites and nitrates which are dissolved in the water.

2. Description of the Prior Art and Problems Solved

A field of art, referred to by some as aquaculture, broadly deals with plants and animals which live in water. It is known in that field of art that fish which live in water can be injured, if not killed, if the water environment in which the fish live becomes excessively polluted with certain dissolved material. Kuhns, in U.S. Pat. No. 4,666,610, discusses materials dissolved in water, and the danger posed by the dissolved materials to fish which live in the water. Kuhns variously refers to the dissolved material as toxins and pollutants. Kuhns addresses the danger under the broad headings of disease management and water quality management, and observes that disease management of fish is related to water quality. The background discussion provided by Kuhns is informative and is included herein by reference.

Materials dissolved in water which Kuhns specifically identifies as toxic to fish, when such materials are present in defined concentrations, are ammonia, chlorine and chloramines. According to Kuhns: Chlorine occurs in water in the form of hypochlorus acid (ClOH) and in ionic form as the hypochlorite ion (ClO—). Ammonia occurs in water as free ammonia ($NH_3$) and in ionic form as the ammonium ion ($+NH_4$), wherein ammonia is said to be more toxic than the ammonium ion. Chloramines, the reaction product of chlorine and ammonia, occurs in water as monochloramine and dichloramine.

It is believed that ammonia is present in natural waters as a direct result of the activity of the animals which live in the water (animal metabolism of proteins; urinary, fecal and respiratory wastes) and bacterial mineralization of nitrogenous bases. Accordingly, fish, and other aquatic organisms, contribute ammonia to their own water. In waste water, the previously mentioned animal sources, as well as technological wastes, account for the presence of ammonia. The presence of ammonia in potable water is believed to be due to the failure to remove it in the purification process or due to the purposeful addition for quality control.

The quantity of ammonia in water which, with respect to fish, is believed to be less than toxic level has been widely reported to be in the range of from about 0.005 to about 0.3 ppm (milligrams per liter of water). According to Kuhns, ammonia levels over 0.3 ppm are considered dangerous. One source states that short-term concentrations of ammonia should not exceed 0.1 mg/L and terms of about 4 days should be less than 0.02 mg/L.

Kuhns states that chlorine is not found in natural waters unless the natural water is mixed with wastewater or a potable water source. The presence of chlorine in water is said to be often caused because it is added to the water in an effort to disinfect municipal water supplies. In this regard, ammonia present in water can react with chlorine to form chloramines.

Kuhns argues that the concentration of chlorine must be reduced to zero before any water in which it is present can be safely used to house fish. He further states that chlorine concentration in the range of from 0.2 to 0.3 ppm is rapidly toxic to fish, and that the U.S. Environmental Protection Agency recommends an upper level of chlorine to be 0.003 ppm for continuous exposure to chlorine by cold water and warm water fishes. It would thus appear that the quantity of chlorine in water considered to be at a non-toxic level for fish is in the range of from about 0.000 to about 0.003 ppm (milligrams per liter of water).

Chloramine, like chlorine, is most often present in water because it is added in an effort to disinfect municipal water supplies. However, some chloramines in natural and waste waters result from the chemical combination of chlorine with the ammonia normally found in these waters. Kuhns states that municipal tap waters can contain chloramines in a concentration in the range of from 0.5 to 4.0 ppm which represents a deadly concentration level for aquatic life.

Kuhns discusses various types of systems for containing fish including the closed, recirculating system, such as a home aquarium, which is characterized by a fixed volume of water which is continuously or intermittently circulated through a fish holding tank. Kuhns maintains that the water environment of the closed, recirculating system can be controlled with intensive care and maintenance.

Kuhns states that the objective of successful water quality management is the removal or neutralization of toxic substances which stress cultured aquatic life forms, such as fish. Kuhns, thus, discloses the addition to the water of a material identified as an alkali metal formaldehydebisulfite, such as sodium formaldehydebisulfite, to remove or neutralize chlorine, chloramines and ammonia. According to Kuhns, the material is not toxic to fish and does not react with dissolved oxygen in either fresh waters or saline waters. Sodium formaldehydebisulfite is also known by other names including formaldehyde sodium bisulfite. The chemical structure of sodium formaldehydebisulfite is believed to be $HO-CH_2-SO_3Na$. The valence state of sulfur in sodium formaldehydebisulfite is believed to be +6.

The toxic nature of chlorine, ammonia and chloramines to fish, as above indicated, has been discussed by Kuhns. However, Kuhns does not discuss the toxic nature of nitrites and nitrates to fish. One author indicates that nitrates in drinking water have caused serious illness and death. The author states that nitrates can be converted to nitrites by action of the human body. The author further states that nitrates and nitrites are likely to remain in water until consumed by plants or other organisms. The author also states the existence of nitrate removal systems involving distillation, reverse osmosis and anion exchange.

Accordingly, there exists a general need for a chemical means of reducing the concentration of ammonia, chlorine, chloramines, nitrites and nitrates dissolved in water, and, more particularly, for reducing the concentration of ammonia, chlorine, chloramines, nitrites and nitrates dissolved water used to house fish.

It is thus an object of this invention to provide a chemical process for reducing the concentration of chloramines, chlorine, ammonia, nitrites and nitrates dissolved in fresh and saline water.

DISCLOSURE OF INVENTION

1. Summary of the Invention

It has been discovered that a water soluble reducing agent comprised of a sulfur-containing, organic compound selected from alkali metal and alkaline earth metal formaldehydesulfoxylates can be used in a process to decrease the concentration of pollutants which are dissolved in saline and fresh water. The method of this invention, featuring the use of the mentioned compound, is particularly useful to reduce the concentration of pollutants dissolved in water used to contain and maintain live fish, such as aquariums. For purposes of the method of this invention, a pollutant is defined to specifically include ammonia, chlorine, chloramines, nitrite ions and nitrate ions. Furthermore, the mentioned compound, when employed in accordance with the method of this invention, can reduce the concentration of the pollutants to levels which are not believed to be toxic to fish.

The water soluble, sulfur-containing, organic compound useful in the method of this invention is known to be a reducing agent, wherein the valence state of the sulfur component of the compound is +4. A more generalized structure of the compound useful herein is disclosed below, but the preferred compounds are the alkali metal formaldehydesulfoxylates, sodium and potassium formaldehydesulfoxylate, and the alkaline earth metal formaldehydesulfoxylates, calcium and magnesium formaldehydesulfoxylate.

The compound useful herein reduces the concentration of chloramines, chlorine, ammonia, nitrites and nitrates in saline and fresh waters, and, when used in accordance with the method of this invention, reduces the concentration of these pollutants to levels which, it is believed, are not toxic to fish which are held in the treated water.

A single species of the compound or a mixture of species can be employed to obtain a reduction in concentration of the pollutants. The compound or compounds can be mixed with various diluents, carriers or other ingredients. The compound can be employed in dry form or in water solution.

The compounds useful herein are known to be oxygen scavengers, accordingly, when treating water used to house fish, oxygen is added to the water by known means, such as by aeration, as the compounds are added to the water. The water soluble, sulfur-containing organic compound useful herein is, for convenience, referred to as the treating material.

2. Description of the Embodiments

This invention provides a method of reducing the concentration of pollutants dissolved in water, comprising introducing into water containing the pollutants an effective amount of a treating material, and permitting the treating material to contact the pollutants in the water for a time sufficient to enable the treating material and pollutants to react to produce reaction products to thereby reduce the concentration of the pollutants in the water.

The pollutants are selected from the group consisting of chloramines, chlorine, ammonia, nitrites, nitrates and mixtures thereof.

The treating material is a sulfur-containing, reducing agent, and, more specifically, is a water soluble, sulfur-containing, organic compound selected from alkali metal and alkaline earth metal formaldehydesulfoxylates. The sulfur component of the sulfur-containing organic compound exhibits a valence of +4. The treating material is not known to be toxic to fish.

The treating material is believed to be an oxygen scavenger, accordingly, when the water being treated is used to house living fish, then, the method of this invention is further comprised of adding to the water, along with the treating material, a quantity of oxygen, such as by aeration, in an amount sufficient to maintain an appropriate level of oxygen dissolved in the water. In this regard, an appropriate level of dissolved oxygen is an amount in the range of from about 6 to about 8 milligrams per liter.

It must be understood that the treating material does not remove the pollutants from water, the pollutants are, instead, converted to reaction products which are not known to be toxic to fish. The method of this invention is still further comprised of removing the reaction products from the water by appropriate means, such as by biological filtration.

The water soluble, sulfur-containing, organic compound is represented by the general structural formula, $R_a$-A-$R_b$ (Formula 1) wherein R is an anion having the formula —(OOS—$CH_2$—OH) and A is an alkali metal or an alkaline earth metal. When A is an alkaline earth metal, then the integers a and b are 1. When A is an alkali metal, then a is 1 and b is 0. Sodium and potassium are preferred alkali metals and calcium and magnesium are preferred alkaline earth metals. The preferred treating material is sodium formaldehydesulfoxylate, which is sometimes referred to herein as SFS. The anion R, —(OOS—$CH_2$—OH), is sometimes referred to herein as the FS anion.

It is believed that the treating material of this invention reacts with the defined pollutants to reduce the concentration of the pollutants in both saline and fresh waters. For purposes of this invention saline water contains in the range of from about 10 to about 34 parts dissolved inorganic solids, such as sodium chloride, per thousand (ppt).

The reactions proceed to completion in water whose pH is in the range of from about 4 to about 10, preferably from about 6 to about 9, and at a temperature whose range begins at least at the freezing point of water, i.e., 32° F., and ends at a temperature less than the decomposition point of the treating material. In this regard, the decomposition temperature of SFS is about 147° F. In more practical terms, the preferred treating temperature within the stated range is less than about 100° F. to avoid rapid depletion of oxygen dissolved in the water. Furthermore, the treating material is effective to reduce the concentration of the defined pollutants in waters whose calcium hardness is in the range of from about 6 to about 14 grains per gallon as calcium carbonate. Thus, experience reveals that the treating material of this invention, under varying conditions of temperature, pH, hardness, and salinity, can simultaneously reduce the concentrations of all defined pollutants in water.

An effective amount of the treating material required to react with pollutants to produce reaction products is discussed below. If an effective amount of treating material is employed, then it is believed that a time sufficient to produce the reaction products is in the range of from a time period greater than 0 to about 60 minutes, and preferably about 10 minutes. It was earlier disclosed that the treating material is an oxygen scavenger. When the reaction products are produced within the previously mentioned time limits then it must be appreciated that there may be treating material that is not depleted, thus, oxygen scavenging can continue. Therefore, continued aeration is urged and no further addition of treating material should be made for about 24 hours.

Neither the reaction mechanisms between the treating material of this invention and pollutants, nor the products of the reactions are known. However, it is believed that the hydroxymethane end of the FS anion, R, of the treating material (Formula 1) reacts with one mole of ammonia, and that the sulfoxylate end of the FS anion, R, of the treating material reacts with one mole of chlorine, as hypochlorus acid (HOCl) or as the hypochlorite ion (OCl—). Thus, it is believed that one mole of an alkali metal formaldehydesulfoxylate reacts with one mole of ammonia and one chlorine species. Since an alkaline earth formaldehydesulfoxylate contains two FS anions, it is believed that one mole of an alkaline earth metal formaldehydesulfoxylate reacts with two moles of ammonia and two chlorines species. As mentioned chloramines are the reaction product of ammonia and chlorine. It is, thus, believed that one mole of an alkali metal formaldehydesulfoxylate reacts with one mole of a chloramine, wherein the ammonia portion reacts with the hydroxymethane end of the anion, and the chlorine portion reacts with the sulfoxylate end of the anion. Since an alkaline earth formaldehydesulfoxylate contains two anions, it is believed that one mole of an alkaline earth metal formaldehydesulfoxylate reacts with two moles of a chloramine.

It is believed that the chlorine reactant occurs in water in the form of hypochlorus acid and in the form of sodium hypochlorite (NaOCl); ammonia can occur as free ammonia and as the ammonium ion; and chloramine, the reaction product of chlorine and ammonia, occurs in water as monochloramine and dichloramine.

The reaction mechanisms between the treating material of this invention and nitrite and nitrate anions and the products of the reactions are also not known. However, treating water containing nitrites and nitrates in accordance with the method of this invention produces a decrease in the concentration of nitrites and nitrates dissolved in the water treated.

One hundred percent active, i.e., pure, alkali and alkaline earth metal formaldehydesulfoxylates may be used directly for water treatment. Thus, in accordance with the above postulated theoretical reaction mechanisms, it can be calculated that a single formaldehydesulfoxylate (FS) anion, R, of the treating material of this invention (95.10 weight units) reacts with 17.03 weight units of ammonia, 52.47 weight units of hypochlorus acid, 51.45 weight units of a hypochlorite ion, 51.48 weight units of monochloramine, 85.92 weight units of dichloramine 62 weight units of nitrate ion and 46 weight units of nitrite ion.

The above weight units can be expressed in any convenient format, but, due to the accepted method of reporting the concentration of pollutants and treating materials involved in treating water, the weight units are usually, and preferably, expressed in milligrams (mg), and still more preferably in terms of milligrams per unit quantity of water, such as milligrams per liter of water (mg/L). It is recognized that milligrams per liter of water (mg/L) is not the identical technical equivalent of parts per million parts (ppm), however, as expressed in ordinary commercial terms, about 5.58 ppm FS anion reacts with about 1 ppm ammonia, about 1.81 ppm FS anion reacts with about 1 ppm hypochlorus acid, about 1.85 ppm FS anion reacts with about 1 ppm hypoclorite ion, about 1.85 ppm FS anion reacts with about 1 ppm monochloramine, about 1.11 ppm FS anion reacts with about 1 ppm dichloramine, about 1.53 ppm FS anion reacts with about 1 ppm nitrate ion and about 2.07 ppm FS anion reacts with about 1 ppm nitrite ion. Accordingly, the theoretical amount of treating material to be employed can range from about 1 to about 16 mg FS anion per mg pollutant.

It is not known that the treating material, when added to water containing a mixture of several of the pollutants, will react with each pollutant species, as theoretically postulated, or will preferentially react with one or more pollutant species. However, the treating material will operate to reduce the concentration of all pollutant species. Accordingly, the method of the invention includes periodic analysis of the water being treated to determine required additional theoretical quantities of treating material to obtain the reduction of pollutants to desired levels.

The theoretical effective amount of treating material to be employed in the method of the invention can be calculated by determining the concentrations of pollutants to be contacted, and then multiplying the determined concentrations by the ratios provided above. It is to be appreciated that the above ratios do not include the weight of cation, A, of the treating material (Formula 1) to be employed, accordingly, adjustments for the particular material are required.

By way of example, it has been calculated that about 0.0131 pounds of 100% active sodium formaldehydesulfoxylate (SFS), can reduce the concentration of pollutants in 60 gallons of salt or fresh water. In more practical terms, this quantity can be expressed to be about 26.25 mg/L. It is believed to be more convenient to add the above stated quantity of active SFS to the water as a solution, such as one containing 18 pounds of SFS per 100 pounds of solution. The density of such a solution is about 1.104 grams solution per milliliter of solution. The solution containing 18 pounds of SFS per 100 pounds of solution is preferably added to the water to be treated at a dosage rate of about 0.133 milliliters of such a solution per liter of water to be treated.

As mentioned, the treating material can be used in 100 percent active form or in dissolved form. Accordingly, the quantity of treating material can range from an amount greater than about 0 weight percent treating material by weight of solution up to 100 weight percent treating material by weight of solution. In the former case, the treating material is very dilute and there is a large quantity of water, while in the latter case, the treating material is undiluted and there is no water. It is believed to be more convenient to treat polluted water with an aqueous solution containing the treating material, wherein the FS anion of the treating material is present in the solution in an amount in the range of from about 5 to about 35, preferably from about 10 to about 30 and still more preferably from about 15 to about 25 pounds FS anion per 100 pounds of solution. An 18 percent by weight solution of SFS in water contains about 14.5 weight percent of FS anion. By way of comparison a 17.6 weight percent solution of calcium formaldehydesulfoxylate also contains about 14.5 weight percent of FS anion.

A variety of inert materials, such as diluents, carriers, excipients, lubricants, disintegrants, and colorants can be mixed with the treating material. A diluent (i.e., tricalcium phosphate) is an inert material used to reduce the concentration of an active material to achieve a desirable and beneficial effect. A carrier (i.e., salt) is an inert material used to deliver or disperse an active material. Suitable diluents and carriers for use with the treating material include salt and other similar, nonreactive, neutral electrolytes such as sodium sulfate and potassium chloride, and non-electrolytes and insoluble salts such as starch, sugars, clays, and calcium sulfate. An excipient (i.e., starch) is an inert material used as a binder in tablets. Suitable excipients for use with the treating material include polymers and gums such as cellulose gum and povidone, and starches. A lubricant (i.e., magnesium stearate) is an inert material used to reduce friction during filling or tableting processes. Suitable lubricants for use with the treating material include fatty acid salts such as calcium stearate or magnesium stearate, and paraffinic compounds and fatty acids such as paraffin wax and stearic acid. A disintegrant is an inert material that causes tablets and boluses to burst upon exposure to appropriate conditions. Suitable disintegrants for use with the treating material include polymers such as cross-linked povidone, and effervescent mixtures such as sodium bicarbonate/citric acid. A colorant is an inert material which imparts color to another material or mixture. Suitable colorants for use with the treating material include lakes (i.e., organic pigments on an adsorptive inorganic substrate) such as rose madder, and non-oxidizing dyes such as acriflavine.

EXAMPLE

A laboratory experiment was performed to determine the ability of sodium formaldehydesulfoxylate to reduce the concentration of chlorine, chloramines, ammonia, nitrites and nitrates dissolved in water.

The water to be treated was prepared by adding 130 milliliters of water taken from an aged aquarium containing live fish to 3870 milliliters of drinking water as supplied by the city of Mesquite, Tex. The aquarium water was a source of nitrates. The city water contained 1.52 ppm total chlorine including 0.10 ppm free chlorine. Thereafter, a total of 4 milliliters of sodium hypochlorite solution was added. Thereafter, a total of 3 milliliters of ammonium chloride solution was added. Finally, a total of 4 milliliters of sodium nitrite solution was added. The thus prepared test water (the test sample), which contained 4011 milliliters (about 1.06 gallons) was then stirred with stir bar and plate for 30 minutes.

The test sample had a pH of 8.1, a temperature of 25° C., calcium hardness of 14 grains per gallon and a salinity of about 0.

The treating material was prepared by dissolving 18 weight parts sodium formaldehydesulfoxylate (SFS) and 2.6 weight parts of a 55% solution of dimethyol dimethyl hydantoin in 79.4 weight parts of deionized water. The treating material was added to the test sample at the rate of about 5 ml per 10 gallons. From the stated volume of the test sample, i.e., 4011 milliliters, it is evident that about 0.53 milliliters of the 18 percent by weight aqueous solution of SFS was added to the test sample. The density of the treating material solution was determined to be about 1.104 grams of solution per milliliter of solution. Accordingly, it was calculated that 0.1053 grams of sodium formaldehydesulfoxylate was used to treat the entire test sample. This total quantity of sodium formaldesulfoxylate is equal to 26.25 mg SFS per liter of test sample.

The concentrations of free chlorine, chloramines, ammonia, nitrites and nitrates in the test sample were determined before addition of the treating material and 10 minutes after addition of all the treating material was completed. The results are set forth in Table 1.

TABLE 1

| | CONCENTRATION, ppm (See Footnote 1) | | |
|---|---|---|---|
| POLLUTANT | INITIAL | FINAL | REDUCTION |
| Free chlorine | 0.24 | 0.00 | 0.24 |
| Chloramines | 2.18 | 0.01 | 2.17 |

TABLE 1-continued

| | CONCENTRATION, ppm (See Footnote 1) | | |
|---|---|---|---|
| POLLUTANT | INITIAL | FINAL | REDUCTION |
| Ammonia | 3.42 | 1.46 | 1.96 |
| Nitrite | 2.28 | 0.17 | 2.11 |
| Nitrate | 27.72 | 13.64 | 14.08 |

Footnote 1
The concentration of pollutants in the test sample was determined by methods described in Hach Water Analysis Handbook, 2nd Edition, 1992. Free and total chlorine, P. 761; Ammonia, Salicylate Method, P. 781; Nitrite, Diazotization Method, P. 784; Nitrate, Cadmium Reduction Method (High Range), P. 783.

Footnote 1
The concentration of pollutants in the test sample was determined by methods described in *Hach Water Analysis Handbook,* 2nd Edition, 1992. Free and total chlorine, P.761; Ammonia, Salicylate Method, P. 781; Nitrite, Diazotization Method, P.784; Nitrate, Cadmium Reduction Method (High Range), P. 783.

From the foregoing it will be seen that this invention is adapted to attain the ends and objects, together with the other advantages which are obvious and which are inherent to the invention.

Since many possible embodiments may be made of the invention without departing from the scope thereof, it is understood that all matter herein set forth or shown in the research examples is to be interpreted as illustrative and not in a limiting sense.

The invention claimed is:

1. A method of treating water comprising,
   providing water having pollutants dissolved therein,
   adding a treating material to said water, and
   permitting said treating material to contact said pollutants in said water;
   wherein:
   said pollutants are selected from the group consisting of nitrites, nitrates and mixtures thereof, and
   said treating material is a composition selected from alkali metal formaldehydesulfoxylates, alkaline earth metal formaldehydesulfoxylates and mixtures thereof.

2. The method of claim 1 wherein said treating material is in a water solution and wherein the formaldehydesulfoxylate anion of said alkali metal formaldehydesulfoxylates and said alkaline earth metal formaldehydesulfoxylates is present in said solution in an amount in the range of from about 5 to about 35 pounds formaldehydesulfoxylate anion per 100 pounds of said solution.

3. The method of claim 2 further comprised of adding oxygen to said water during addition of said treating material to said water.

4. A process for reducing the concentration of pollutants dissolved in water comprising,
   adding to said water an effective amount of a treating material to thereby contact said pollutants in said water with said treating material, and
   maintaining said contact for a time sufficient to enable said treating material to react with said pollutants to thereby reduce the concentration of said pollutants in said water;
   wherein:
   said pollutants are selected from the group consisting of nitrites, nitrates and mixtures thereof, and
   said treating material is a water-soluble, reducing agent including a sulfur-containing organic compound, wherein the sulfur component of said organic compound has a valence of +4.

5. The method of claim 4 wherein said sulfur-containing organic compound is a composition selected from alkali metal formaldehydesulfoxylates, alkaline earth metal formaldehydesulfoxylates and mixtures thereof.

6. The method of claim 5 wherein said sulfur-containing organic compound is an alkali metal formaldehydesulfoxylate.

7. The method of claim 6 wherein said alkali metal formaldehydesulfoxylate is sodium formaldehydesulfoxylate.

8. The method of claim 7 wherein said sodium formaldehydesulfoxylate is present in a water solution containing about 18 pounds of said sodium formaldehydesulfoxylate per 100 pounds of said solution.

9. The method of claim 8 wherein said solution is added to said water at the rate of about 0.13 milliliters solution per liter of said water.

10. The method of claim 4 further comprised of analyzing said water subsequent to addition of said treating material to determine the concentration of pollutants dissolved therein and thereafter adding treating material to said water at the rate of about 1.5 mg of formaldehydesulfoxylate anion per mg of nitrate and about 2 mg of formaldehydesulfoxylate anion per mg nitrite.

11. The method of claim 10 further comprised of adding oxygen to said water during addition of said treating material to said water.

12. The method of claim 11 wherein said water contains live fish.

13. A method of treating water having pollutants dissolved therein, said method being comprised of the steps of,
adding to said water an effective amount of treating material to contact said pollutants, and
maintaining said contact for a time sufficient to enable said treating material to react with said pollutants;
wherein:
said pollutants are selected from the group consisting of nitrites, nitrates and mixtures thereof, and
said treating material is a compound represented by the general structural formula $R_a\text{-A-}R_b$ wherein said compound,
R is an anion having the formula —(OOS—$CH_2$—OH),
A is an alkali metal or an alkaline earth metal, a is 1, and b is 1 or 0; A is an alkaline earth metal when b is 1, and A is an alkali metal when b is 0.

14. The method of claim 13 wherein said effective amount of said treating material is an amount in the range of from about 1 to about 16 mg of said R anion per mg pollutant.

15. The method of claim 14 wherein said effective amount of said treating material is an amount which contains about 1.5 mg of said R anion per mg of nitrate and about 2 mg of said R anion per mg nitrite.

16. A method of treating water comprising,
providing water having pollutants dissolved therein,
adding a treating material to said water, and
permitting said treating material to contact said pollutants in said water;
wherein:
said pollutants are selected from the group consisting of ammonia, chlorine, chloramines, hypochlorus acid, hypochlorite, nitrites, nitrates and mixtures thereof,
said treating material is a composition selected from alkali metal formaldehydesulfoxylates, alkaline earth metal formaldehydesulfoxylates and mixtures thereof;
and, further, wherein:
said treating material is in a water solution and wherein the formaldehydesulfoxylate anion of said alkali metal formaldehydesulfoxylates and said alkaline earth metal formaldehydesulfoxylates is present in said solution in an amount in the range of from about 5 to about 35 pounds formaldehydesulfoxylate anion per 100 pounds of said solution.

17. The method of claim 16 further comprised of adding oxygen to said water during addition of said treating material to said water.

18. A process for reducing the concentration of pollutants dissolved in water comprising,
adding to said water an effective amount of a treating material to thereby contact said pollutants in said water with said treating material, and
maintaining said contact for a time sufficient to enable said treating material to react with said pollutants to thereby reduce the concentration of said pollutants in said water;
wherein:
said pollutants are selected from the group consisting of ammonia, chlorine, chloramines, hypochlorus acid, hypochlorite, nitrites, nitrates and mixtures thereof,
said treating material is a water-soluble, reducing agent including a sulfur-containing organic compound, wherein said sulfur-containing organic compound is a composition selected from alkali metal formaldehydesulfoxylates, alkaline earth metal formaldehydesulfoxylates and mixtures thereof and said composition is present in a water solution containing about 14.5 pounds of formaldehydesulfoxylate anion per 100 pounds of said solution.

19. The method of claim 18 wherein said sulfur-containing organic compound is an alkali metal formaldehydesulfoxylate.

20. The method of claim 19 wherein said alkali metal formaldehydesulfoxylate is sodium formaldehydesulfoxylate.

21. The method of claim 20 wherein said sodium formaldehydesulfoxylate is present in said water solution in an amount of about 18 pounds of said sodium formaldehydesulfoxylate per 100 pounds of said solution.

22. The method of claim 21 wherein said solution is added to said water at the rate of about 0.13 milliliters solution per liter of said water.

23. The method of claim 18 further comprised of analyzing said water subsequent to addition of said treating material to determine the concentration of pollutants dissolved therein and thereafter adding treating material to said water at the rate of about 5.5 mg of said formaldehydesulfoxylate anion per mg ammonia, about 1.8 mg of said formaldehydesulfoxylate anion per mg of hypochlorus acid, about 1.8 mg of said formaldehydesulfoxylate anion per mg of hypochlorite, about 1.8 mg of said formaldehydesulfoxylate anion per mg of monochloramine, about 1.1 mg of said formaldehydesulfoxylate anion per mg of dichloramine, about 1.5 mg of said formaldehydesulfoxylate anion per mg of nitrate and about 2 mg of said formaldehydesulfoxylate anion per mg nitrite.

24. The method of claim 23 further comprised of adding oxygen to said water during addition of said treating material to said water.

25. The method of claim 24 wherein said water contains live fish.

26. A method of treating water having pollutants dissolved therein, said method being comprised of the steps of,
adding to said water an effective amount of treating material to contact said pollutants, and
maintaining said contact for a time sufficient to enable said treating material to react with said pollutants;
wherein:
said pollutants are selected from the group consisting of ammonia, chlorine, chloramines, hypochlorus acid, hypochlorite, nitrites, nitrates and mixtures thereof, and
said treating material is a water solution of a compound represented by the general structural formula $$R_a\text{-}A\text{-}R_b$$

wherein said compound,
R is an anion having the formula —(OOS—CH$_2$—OH),
A is an alkali metal or an alkaline earth metal, a is 1, and b is 1 or 0; A is an alkaline earth metal when b is 1, and A is an alkali metal when b is 0, and said anion is present in said solution in an amount in the range of from about 5 to about 35 pounds of said anion per 100 pounds of said solution.

27. The method of claim 26 wherein said effective amount of said treating material is an amount in the range of from about 1 to about 16 mg of said R anion per mg pollutant.

28. The method of claim 26 wherein said effective amount of said treating material is an amount which contains about 5.5 mg of said R anion per mg ammonia, about 1.8 mg of said R anion per mg of hypochlorus acid, about 1.8 mg of said R anion per mg of hypochlorite, about 1.8 mg of said R anion per mg of monochloramine, about 1.1 mg of said R anion per mg of dichloramine, about 1.5 mg of said R anion per mg of nitrate and about 2 mg of said R anion per mg nitrite.

* * * * *